United States Patent [19]

Goguen

[11] 4,326,671

[45] Apr. 27, 1982

[54] ANTI-SIPHON SELECTOR VALVE

[76] Inventor: Robert P. Goguen, 350 Laurelwood Rd., Santa Clara, Calif. 95050

[21] Appl. No.: 118,733

[22] Filed: Feb. 5, 1980

[51] Int. Cl.$^3$ ............................................. F16K 24/02
[52] U.S. Cl. ..................................... 239/66; 137/217; 137/218; 137/625.11; 137/625.46; 239/446
[58] Field of Search ................... 137/217, 218, 625.11, 137/625.46; 239/66, 444, 446

[56] References Cited

U.S. PATENT DOCUMENTS

| | | |
|---|---|---|
| 2,294,092 | 8/1942 | Moody . |
| 2,927,598 | 3/1980 | Thompson ........................ 137/218 |
| 3,024,372 | 3/1962 | Seele . |
| 3,056,418 | 10/1962 | Adams et al. . |
| 3,232,307 | 2/1966 | Bucknell et al. . |
| 3,713,457 | 1/1973 | McInnis et al. . |
| 3,727,630 | 4/1973 | McInnis . |
| 3,828,932 | 8/1974 | Schneer . |
| 3,863,675 | 2/1975 | Wiltshire . |
| 4,125,124 | 11/1978 | Kah ................................ 137/217 X |

Primary Examiner—Gerald A. Michalsky
Attorney, Agent, or Firm—Phillips, Moore, Lempio & Majestic

[57] ABSTRACT

An anti-siphon, selector valve for directing fluid into one of a plurality of lines. The valve includes a valve body having an input port and a plurality of output ports and a U-shaped conduit mounted on the valve body and selectively connectable between the input port and one of the output ports. The valve further includes an anti-siphon valve assembly mounted in the U-shaped conduit for venting the output port and the lines to which it is connected to the atmosphere.

8 Claims, 3 Drawing Figures

U.S. Patent    Apr. 27, 1982    4,326,671
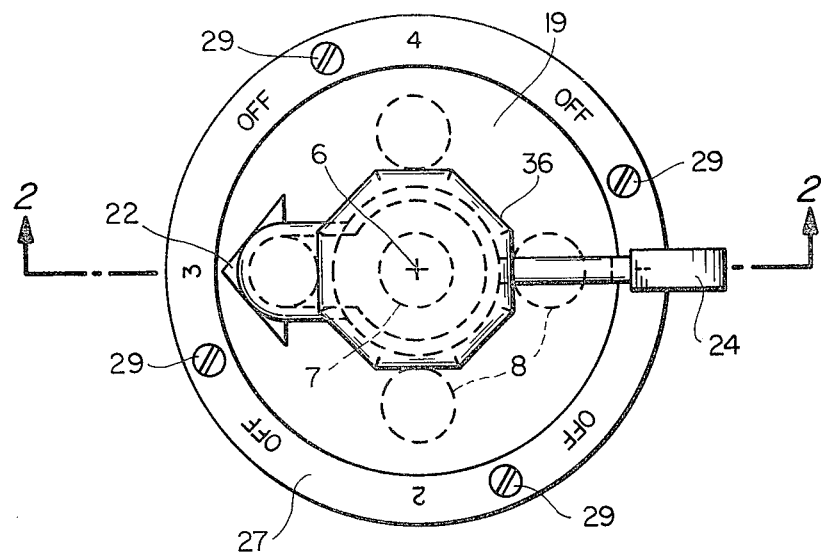
FIG_1
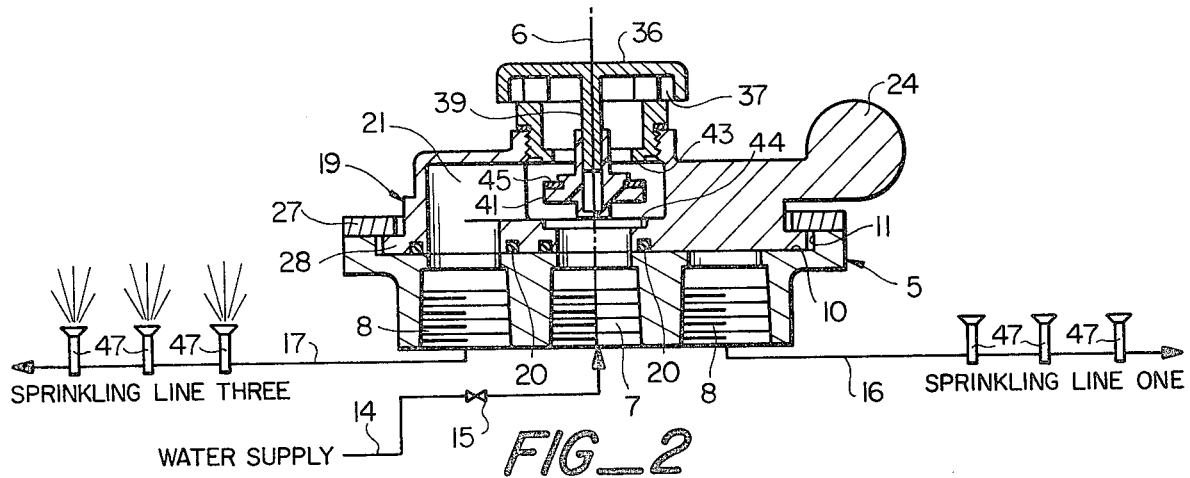
FIG_2
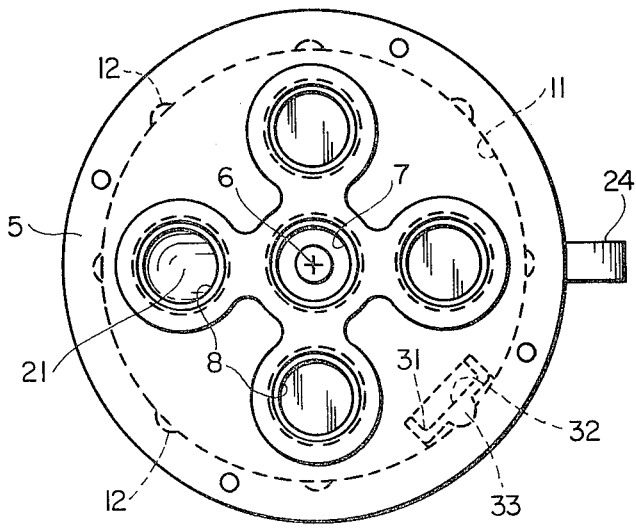
FIG_3

ANTI-SIPHON SELECTOR VALVE

TECHNICAL FIELD

This invention relates to selector valves for directing a fluid into one of a plurality of lines and to anti-siphon valves that prevent a fluid from being drawn back to its source.

BACKGROUND ART

Water sprinkling systems are commonly used to distribute water to flora including lawns, plants, and trees. A typical sprinkling system includes a manifold which is connected to a source of water under pressure and a plurality of water sprinkling lines connected to the manifold. Each sprinkling line directs water from the manifold to a specific location and terminates in one or more nozzles. The nozzles spray the water directly on the lawn or plants desired to be watered. Each sprinkling line commonly contains a globe valve and an anti-siphon valve. The globe valves control the duration and amount of flow through the sprinkling lines. The anti-siphon valves prevent contaminated water from being brought into contact with a potable water source. These valves prevent the water on the ground from being drawn back through the sprinkling lines. On lawns, for example, ground water can become contaminated from the fertilizers and insecticides which are used in maintaining the lawn.

Although most water sprinkling systems are quite reliable, the manifolds on these systems are complex and expensive. A typical manifold connects to four to eight sprinkling lines and each line includes a globe valve and an anti-siphon valve. Thus, a manifold may contain anywhere from eight to sixteen valves. Further, these water sprinkling systems can be inconvenient to operate because in order to change the water flow from one sprinkling line to another, it is necessary to shut one globe valve and open another. When a substantial number of sprinkling lines are used, this process can be quite time consuming.

The present invention is directed to overcoming one or more of the problems as set forth above.

DISCLOSURE OF THE INVENTION

The present invention contemplates an anti-siphon, selector valve for directing an incoming fluid into one of a plurality of output ports. The valve includes a valve body having an input port and a plurality of output ports, a conduit mounted on the valve body and selectively connectable between the input port and one of the output ports, and an anti-siphon assembly in communication with the conduit for venting the output ports to the atmosphere when the fluid in the valve is substantially atmospheric.

The present invention overcomes the disadvantages of the prior art by incorporating an anti-siphon valve and a selector valve. The resulting valve is able to replace the plurality of valves previously necessary on water sprinkling manifolds and is more convenient to use than prior valves because a single rotary motion changes the flow between the sprinkling lines. Further, the valve disclosed herein has both the advantages of lower cost and simplicity in construction.

Other aspects, objects, and advantages of this invention can be obtained from a study of the drawings, the disclosure, and the appended claims.

BRIEF DESCRIPTION OF THE DRAWINGS

FIG. 1 is a top plan view of a valve according to one embodiment of the present invention.

FIG. 2 is a side elevational view of the valve of FIG. 1 in section taken along line 2—2 of FIG. 1.

FIG. 3 is a bottom plan view of the valve of FIG. 1.

BEST MODE FOR CARRYING OUT THE INVENTION

FIGS. 1—3 illustrate a valve according to one embodiment of the present invention. The valve includes a valve body 5 having a generally circular cross section and circular symmetry about the center axis 6. The valve body includes a center input port 7 and four output ports 8 distributed adzmuthally around the center axis 6. All the ports are threaded to receive conventional pipe threads. In FIG. 2 it can be seen that an input conduit 14 from the water supply is connected to the input port 7. The water supply is shut off by an isolation valve 15 of conventional construction. The output ports are each connected to sprinkling lines, for example, line number one, 16 and line number three, 17. In addition, the valve body has a stepped circular notch 10 located around the outside of the circle of output ports 8. The notch receives the selector member 19 described below. Located in the side wall 11 of the notch are a plurality of recesses 12 which receive a detent 31 also described below.

Referring to FIG. 2, the anti-siphon, selector valve includes a hollow selector member 19 that is mounted for rotation about the center axis 6 with respect to the valve body 5. The selector member is received in the stepped notch 10 in the valve body and has a plurality of O-ring grooves 20 each containing an O-ring. As illustrated in FIG. 3, the O-rings seal the ports 7,8 between the valve body 5 and the selector member 19 when the selector member is aligned to direct incoming fluid into one of the output ports. The selector member also includes a U-shaped conduit 21 which selectively communicates between the input port 7 and one of the output ports 8. As shown in FIG. 2, the conduit has first and second parallel legs and a connecting medial leg. The first or inside leg of the conduit is coaxial with the center axis 6 of the valve. The second or outside leg of the conduit selectively communicates with the output ports 8.

The selector member 19 is moved by hand around the center axis 6 of the valve using a fin 24 so that the U-shaped conduit is successively brought into communication with each of the output ports 8. The selector member 19 is retained in the notch 10 using a retaining ring 27 and is thereby permitted to rotate around the center axis 6. The retaining ring engages a flange portion 28 of the selector member and forces the selector member against the valve body 5. The retaining ring 7 is held in place by a plurality of bolts 29.

Referring to FIG. 1, the top of the retaining ring 27 is marked with numerals indicating the corresponding output ports. The position of the conduit 21 is indicated by the arrow 22 on the selector valve. As indicated in FIG. 1 the second leg of the conduit 21 is in communication with sprinkling line three. It should be noted in FIG. 1 that the output ports 8 are azimuthally spaced apart sufficiently so that the U-shaped conduit is blanked off when it sits in between the ports. This is the off position where no flow is permitted through the valve.

Referring to FIG. 3, the selector member 19 also includes a spring loaded detent 31 which engages the recesses 12 in the sidewall 11 of the notch 10. The detent is captured in a small cavity in the side wall of the flange portion 28 of the selector member. The detent is urged in an outward direction away from the center axis 6 along a radius of the valve. The detent can be the unitary plastic member illustrated in FIG. 3. The member has a generally U-shaped cross section and the medial portion 32 resiliently deforms inward when the bead portion 33 is rotated out of the recess 12. A compression spring and ball bearing can also be used.

A cap 36, FIG. 2 is threaded into the top of the selector member 19 along the center axis 6 to a position directly above the input port 7. The cap contains a plurality of orifices 37 which permit communication between the conduit 21 and the atmosphere. Located in the center of the cap is a guide rod 39 which is coaxial with the center axis 6 of the valve. The guide rod is an integral part of the cap and is used to guide the motion of a piston 41 located within the conduit 21. The piston slides up and down along the guide rod between an upper seat 43 formed by the bottom wall of the cap and a lower seat 44 formed in the bottom wall of the conduit 21. The piston has a gasket ring 45 which insures sealing against leakage when the piston is urged against the upper seat 43. The piston slides up and down in response to the pressure of the fluid flowing through the conduit 21 and the force of gravity. When the piston is urged against the upper seat 43 by fluid pressure, conduit 21 is sealed from the atmosphere and the fluid flowing through the valve is prevented from escaping. When the piston 21 is urged away from the upper seat 43 and toward the lower seat 44 by the force of gravity, the output port 8 is vented through the conduit 21 and the cap 36 to the atmosphere. The piston, the guide rod, and the seats form an anti-siphon valve as described below.

The anti-siphon, selector valve is placed in operation by connecting the input port 7, FIG. 2 to a water supply using an input conduit 14. The isolation valve 15 separates the valve and the water sprinkling lines 16, 17 from the water supply. The isolation valve 15 is optional because the conduit 21 is blanked off by the valve body 5 at the intermediate positions between the output ports 8. The output ports 8 are each connected to the water sprinkling lines. Each line contains at least one nozzle 47 for directing the water onto the flora selected to be watered.

To direct a flow of water through the valve, the selector member 19 is rotated with respect to the valve body 5 to a position which places conduit 21 in communication with the input port 7 and the selected output port 8. As illustrated in FIG. 1, four output ports are available in this embodiment. Next, the isolation or control valve 15 is opened. The resulting water pressure in the conduit 21 causes the piston 41 to raise, engage the upper seat 43 and seal conduit 21 from the atmosphere. Water flows through the conduit, out the selected output port and into the sprinkling line 17.

If the water pressure in conduit 21 drops to substantially atmospheric pressure, the piston 41 falls by gravity and drops away from the upper seat 43. Conduit 21 is then vented to the atmosphere. This venting prevents any siphon from being created between the selected sprinkling line 17 and the input conduit 14. Thus, contaminated ground water can not be drawn from the nozzles back through the valve to the potable water supply.

To select a different sprinkling line, the selector member 19 is rotated with respect to the valve body 5 using the fin 24. The selector member rotates about the center axis 6 of the valve and the conduit 21 is brought sequentially into communication with all of the output ports. It should be noted in FIG. 2 that when the selector member is rotated, this rotation occurs about the axis of the guide rod 39 and hence the piston 41 and the input port 7 remain constantly in communication with conduit 21.

Thus, it will be seen that the present invention provides a rotary selector valve for directing a fluid into one of a plurality of lines and also a valve that includes an anti-siphon valve. The resulting valve is extremely versatile, convenient, and consolidates the function of a plurality of other valves. Moreover, the simplicity of its construction permits its wide utility at low cost.

Although one embodiment of the invention has been shown and described in the context of a water sprinkling system, it will be apparent that other adaptations and modifications can be made using other fluids and different arrangements of ports, for example, without departing from the spirit and scope of the invention.

I claim:

1. An anti-siphon, selector valve for directing incoming fluid through one of a plurality of output ports, comprising:
   (a) a valve body having therein an input port and a plurality of output ports disposed about the input port;
   (b) a conduit member rotatably mounted on the valve body and selectively connectable between the input port and one of the output ports so that incoming fluid entering the input port is directed out one of the output ports; and
   (c) anti-siphon valve means mounted in the conduit member for venting the output ports to the atmosphere through the conduit when the pressure of fluid in the valve is substantially atmospheric.

2. The valve of claim 1 wherein the anti-siphon valve means includes a vertically translatable piston mounted in the conduit member and is selectively connectable to vent all of the output ports to the atmosphere.

3. The valve of claim 1 including means connected to the conduit member for rotating the conduit member with respect to the valve body so that the conduit member is successively brought into fluid communication with each of the output ports.

4. An anti-siphon, rotary selector valve for directing incoming fluid into one of a plurality of output ports, comprising:
   (a) a valve body having a centrally disposed input port and a plurality of output ports disposed in a circle about the input port;
   (b) a hollow selector member housing a rotatable U-shaped conduit having first and second parallel legs and a connecting medial leg, said first leg communicates with the input port and the second leg selectively communicates with one of the output ports so that incoming fluid entering the input port is directed out one of the output ports, said selector member is mounted for rotation about an axis including the first leg;
   (c) an anti-siphon piston mounted in the conduit and slidable between a first position where the piston seals the conduit from the atmosphere and a second position where the piston vents the conduit to the atmosphere; and (d) an elongate guide member located in the conduit for guiding the piston between the first and second positions, said guide member having an axis that is coincident with the axis of rotation of the selector member.

5. The valve of claim 4 wherein the input and output ports are all disposed with parallel axes in the valve body and wherein the valve includes means connected to the selector member for rotating the conduit about the axis of rotation that is coincident with the axes of the input port and the first leg of the conduit.

6. The valve of claim 4 wherein the output ports are azimuthally spaced apart sufficiently so that the U-shaped conduit is successively blanked off between the output ports by the valve body, thereby blocking the flow of fluid through the valve.

7. The valve of claim 4 further including a vented cap mounted on the conduit, said cap having the elongate guide member with the axis thereof coincident with the axis of rotation of the selector member for guiding the piston between the first and second positions, in said first position the piston is urged against the cap by fluid pressure in the conduit and seals the conduit from the atmosphere and in the second position the piston is urged by gravity away from the cap and vents the conduit to the atmosphere through the cap.

8. Apparatus for watering flora, comprising:

(a) a selector valve body having therein an input port and a plurality of output ports disposed about the input port, a conduit member rotatably mounted on the valve body selectively connectable between the input port and one of the output ports, and an anti-siphon valve piston mounted in the conduit member coincident with the axis of rotation thereof to vent the output ports when the water pressure in the conduit member is substantially atmospheric;

(b) an input conduit connecting the input port of the selector valve to a source of water under pressure;

(c) a plurality of output conduits connecting the output ports of the selector valve to a plurality of nozzles for watering flora;

(d) a control valve for varying the rate of flow of water to a nozzle, said control valve being connected to one of said conduits; and (e) an elongate guide member located in the conduit member on the axis of rotation thereof for guiding the piston.

* * * * *